(12) United States Patent
Jung et al.

(10) Patent No.: US 9,124,498 B2
(45) Date of Patent: Sep. 1, 2015

(54) SYSTEM AND METHOD FOR IDENTIFYING OPTIMAL CLOUD CONFIGURATION IN BLACK-BOX ENVIRONMENTS TO ACHIEVE TARGET THROUGHPUT WITH BEST PRICE BASED ON PERFORMANCE CAPABILITY BENCHMARKING

(71) Applicant: Xerox Corporation, Norwalk, CT (US)

(72) Inventors: Gueyoung Jung, Rochester, NY (US); Tridib Mukherjee, Bangalore (IN)

(73) Assignee: Xerox Corporation, Norwalk, CT (US)

( * ) Notice: Subject to any disclaimer, the term of this patent is extended or adjusted under 35 U.S.C. 154(b) by 275 days.

(21) Appl. No.: 13/767,070

(22) Filed: Feb. 14, 2013

(65) Prior Publication Data
US 2014/0229607 A1     Aug. 14, 2014

(51) Int. Cl.
| | |
|---|---|
| G06F 15/173 | (2006.01) |
| H04L 12/26 | (2006.01) |
| H04L 29/08 | (2006.01) |
| G06F 9/50 | (2006.01) |
| H04L 12/24 | (2006.01) |

(52) U.S. Cl.
CPC .......... *H04L 43/0876* (2013.01); *G06F 9/5072* (2013.01); *H04L 41/5009* (2013.01); *H04L 41/5051* (2013.01); *H04L 43/08* (2013.01); *H04L 67/10* (2013.01); *H04L 67/34* (2013.01)

(58) Field of Classification Search
CPC ... H04L 29/08072; H04L 29/06; H04L 29/00; H04L 29/22; H04L 29/2602; H04L 29/0826; H04L 29/083; H04L 29/0823; H04L 29/44; H04L 29/5077; H04L 29/0712; H04L 41/5009; H04L 41/5051; H04L 43/08; H04L 43/0876; H04L 67/10; H04L 67/34; G06F 9/5072

USPC .......................................... 709/222–226, 229
See application file for complete search history.

(56) References Cited

U.S. PATENT DOCUMENTS

| | | | |
|---|---|---|---|
| 6,505,249 B1 * | 1/2003 | Rehkopf | 709/224 |
| 7,757,214 B1 * | 7/2010 | Palczak et al. | 717/121 |
| 8,127,032 B2 * | 2/2012 | Branson et al. | 709/229 |
| 2013/0111491 A1 * | 5/2013 | Glew et al. | 718/104 |
| 2014/0019966 A1 * | 1/2014 | Neuse et al. | 718/1 |

OTHER PUBLICATIONS

Huang, Shengsheng, et al. "The HiBench Benchmark Suite: Characterization of the MapReduce-Based Data Analysis", IEEE, ICDE Workshops 2010, pp. 41-51.
Jayasinghe, Deepal, et al., "Variations in Performance and Scalability when Migrating n-Tier Applications to Different Clouds", IEEE 4th International Conference on Cloud Computing, 2011, pp. 73-80.

* cited by examiner

*Primary Examiner* — Chirag R Patel
*Assistant Examiner* — Anh Nguyen
(74) *Attorney, Agent, or Firm* — Fay Sharpe LLP

(57) ABSTRACT

A method and system identifies a cloud configuration for deploying a software application. A performance of a target application and workload is characterized. A set of benchmark applications is then deployed into at least one target cloud infrastructure. The target infrastructure is characterized using the set of benchmarking applications. The performance of the target application is represented with a set of bins each corresponding to a resource subsystem of a virtual machine and a performance score that is required to deploy the target application and meet the target performance. The bins are filled with performance values for selected target virtual machines. Using the filled bins, a set of virtual machines needed to satisfy the target cloud infrastructure is determined. A recommendation is provided for the set of virtual machines to use in deploying the software application.

18 Claims, 10 Drawing Sheets

COMPARE TO OTHER CLOUD VENDORS

○ PRICE BASED    ● PERFORMANCE BASED

|  | OUR OFFER | CLOUD 1 | CLOUD 2 | CLOUD 3 |
|---|---|---|---|---|
| PRICE | $9.00 / DAY | $8.60 / DAY | $8.80 / DAY | $9.00 / DAY |
| DISCOUNT | $2.00 / DAY | N/A | N/A | $1.50 |
| PERFORMANCE | 9.5 MIN / REQUEST | 10 MIN / REQUEST | 25 MIN / REQUEST | 15 MIN / REQUEST |

FIG. 1A

COMPARE TO OTHER CLOUD VENDORS

● PRICE BASED    ○ PERFORMANCE BASED

|  | OUR OFFER | CLOUD 1 | CLOUD 2 | CLOUD 3 |
|---|---|---|---|---|
| PRICE | $9.00 / DAY | $8.90 / DAY | $22.00 / DAY | $16.00 / DAY |
| DISCOUNT | $2.00 / DAY | N/A | N/A | $1.50 |
| PERFORMANCE | 9.5 MIN / REQUEST | 9.5 MIN / REQUEST | 9.6 MIN / REQUEST | 9.4 MIN / REQUEST |

FIG. 1B

SYSTEM AND METHOD FOR IDENTIFYING OPTIMAL CLOUD CONFIGURATION IN BLACK-BOX ENVIRONMENTS TO ACHIEVE TARGET THROUGHPUT WITH BEST PRICE BASED ON PERFORMANCE CAPABILITY BENCHMARKING

BACKGROUND

The present disclosure relates to a method and system for identifying a cloud configuration used for deploying a software application. More specifically, a set of virtual machines, which is needed to satisfy the target performance in the cloud infrastructure, is determined by characterizing a performance of the application and a workload of candidate cloud infrastructures.

An optimal cloud configuration, i.e., a combination of virtual machines (VMs), is desired by cloud users that want to deploy a software application into a cloud infrastructure. One problem encountered by a cloud user that is purchasing virtual machines is a difficulty identifying a cloud configuration that enables the best performance of its web service. The task is challenging because cloud providers do not reveal their infrastructure configuration details, such as, for example, resource availability, and structure of physical servers, storages, network switches, and virtual machine management. Rather, these cloud providers only show a list of VM configurations and prices. Therefore, the cloud user is left to make a decision in a black-box environment.

The process of identifying the best cloud configuration can be expensive in the black-box environment. A cloud user provisions system resources to meet its throughput goals. The cloud user can over-provision in the black-box environment to reduce a risk of not meeting its throughput. Unnecessary over-provisioning can result in higher costs.

Due to the shortage of information, a cloud user can also explore candidate cloud configurations by deploying its complex application into each cloud configuration. The cloud user can measure its throughput in each cloud configuration to find the cloud provider that is offering the best price. However, the process of blindly exploring a number of different cloud configurations can be very expensive and time consuming. The deployment process is complicated when there are a number of different cloud configurations to be evaluated.

Therefore, a system and method are desired that compares black-box clouds and identifies the best cloud configuration for deploying a given application having certain throughput goals and price preferences.

BRIEF DESCRIPTION

The present disclosure proposes a cloud recommender system that deploys a target application in a white-box test-bed. The system is designed to (i) estimate the maximum throughput, or the best price, of given software application in a target cloud and (ii) compare offerings made by the cloud providers.

One embodiment of the disclosure relates to a method for identifying a cloud configuration for deploying a software application. The method includes characterizing a performance of a target application and workload. The method includes deploying a set of benchmark applications into at least one target cloud infrastructure. The method includes characterizing the target infrastructure using the set of benchmarking applications. The method includes representing the performance with a set of bins each corresponding to a resource subsystem of a virtual machine and a performance score that is required to deploy the target application and meet the target performance. The method includes filling the bins with performance values for selected target virtual machines. Using the filled bins, the method includes determining a set of virtual machines needed to satisfy the target cloud infrastructure. The method includes providing a recommendation of the set of virtual machines to a user deploying the software application.

Another embodiment of the disclosure relates to a system for identifying a cloud configuration for deploying a software application. The system includes a target application performance module that is adapted to characterize a performance of a target application. The system includes a target cloud infrastructure performance module that is adapted to characterize a workload of the at least one target cloud infrastructure. The system includes a cloud configuration determination module that is adapted to represent the performance with a set of bins each corresponding to a resource subsystem of a virtual machine and a performance score that is required to deploy the target application and performance. The cloud configuration determination module is further adapted to fill the bins with performance values for a select target cloud infrastructure. Using the filled bins, the cloud configuration determination module is further adapted to determine a set of virtual machines needed to satisfy the target performance in the at least one target cloud infrastructure. The system further includes a user interface that is adapted to provide a recommendation for the set of virtual machines to a user deploying the software application. The system also includes a processor that is adapted to execute the modules.

BRIEF DESCRIPTION OF THE DRAWINGS

FIGS. 1A and 1B are tables showing price and performance comparisons between different cloud configurations provided by a number of cloud providers.

DETAILED DESCRIPTION

The present disclosure teaches a recommender system that enables cloud users to compare prices and performances of the different cloud configurations that are offered by cloud providers. The comparisons enable the cloud user to identify the best cloud configuration for deploying a given application. Furthermore, cloud providers can also use the price and performance comparisons for determining a price strategy and improving performance.

For example, FIG. 1A shows a performance comparison among a user, that is a cloud provider, and three other cloud providers. Each cloud provider offers a similar price for deployment of the application into the target cloud. However, the processing time for responding to a request varies among the providers. Similarly, each cloud provider can achieve a similar performance in the comparison shown in FIG. 1B, but it can offer the deployment at a different price. The cloud provider can use this information, for example, to adjust its price for competing with other providers.

Figure 2:
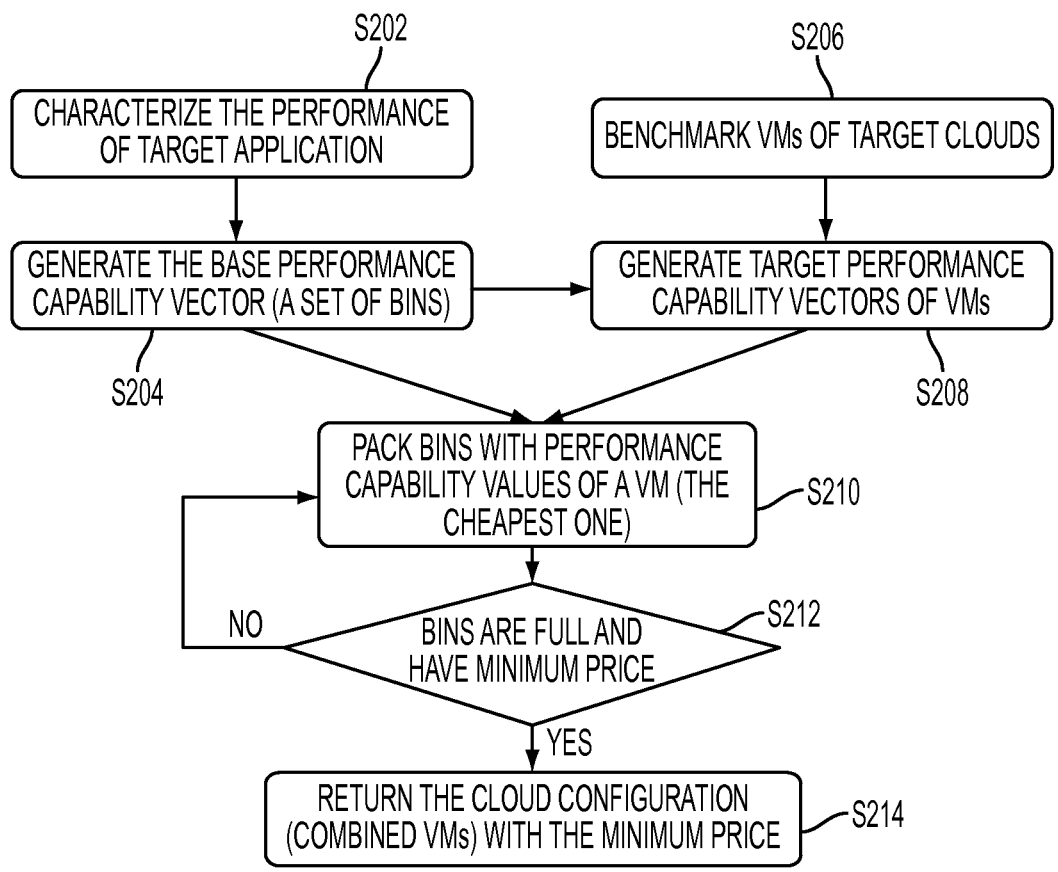
FIG. 2 is an overview of a method for identifying a cloud configuration according to the present embodiment.

FIG. 2 provides an overview of a method 200 for identifying a cloud configuration. A performance of a target application and workload is characterized at S202. The performance is characterized in a white-box test-bed, whereby infrastructure configuration details are known. This performance is characterized in terms of a resource usage pattern for the (VM) sub-systems (s.a., e.g., CPU, system call, context switch, memory capacity, disk I/O, and network I/O) that are required to deploy the target application. More specifically, the resource usage pattern is used to generate a base performance capability vector at S204. Each feature of the vector represents the required performance capability value of a respective resource sub-system that is needed to meet a given target throughput.

Concurrently, a set of benchmark applications are deployed into at least one target cloud. The target infrastructures are characterized using the set of benchmarks at S206. More specifically, performance characteristics of the target clouds are captured using a benchmark suite at S206. A set of performance vectors are generated using the benchmarking results of the target clouds at S208. Each vector represents the performance capability of a specific VM (or physical server). Because the benchmarking results can dynamically change over time, the characterization of the target infrastructures can be completed as an offline batch process that is periodically scheduled.

The base performance capability vector is represented as a set of bins. More specifically, the set of bins is used to represent each resource subsystem of a virtual machine. The size of each bin is based on a performance score that is required by the subsystem to deploy the target application and meet the target performance. The bins are filled with the performance capability values for the virtual machines at S210. After the bins are filled with the performance values of each virtual machine, the system determines if the bins are full at S212. For the bins not being full (NO at S212), the system repeats S210 and fills the bins with performance values for an additional virtual machine. The system searches for an optimal cloud configuration until the price is minimized. For the bins being full (YES at S212), the system recommends the cloud configuration, including the combination of VMs used to satisfy the throughput goal of the target cloud infrastructure at a minimum price at S214.

Figure 3:
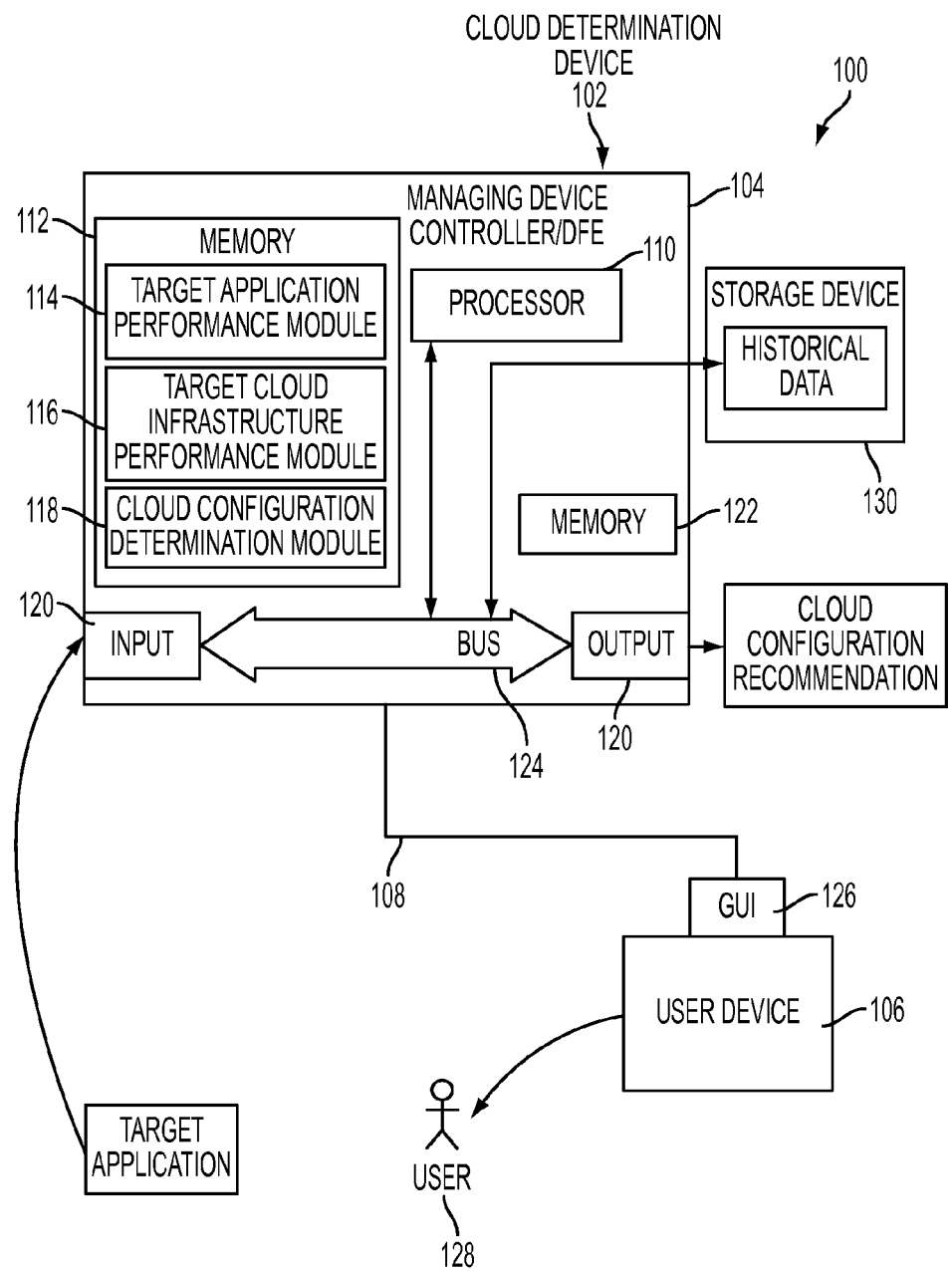
FIG. 3 is a schematic illustration of a cloud configuration recommendation system in one aspect of the exemplary embodiment.

FIG. 3 is a functional block diagram of a cloud recommendation system 100 in one exemplary embodiment. The system 100 includes a cloud determination device 102, hosted by a computing device 104, such as a server computer at a service provider site, and/or a user device 106, hosted by a computing device, at a customer site, such as a server, which can be linked together by communication links 108, referred to herein as a network. These components are described in greater detail below.

The cloud configuration determination device 102 illustrated in FIG. 3 includes a processor 110, which controls the overall operation of the cloud configuration determination device 102 by execution of processing instructions, which are stored in memory 112 connected to the processor 110.

The cloud configuration determination processes that are disclosed herein are performed by the processor 110 according to the instructions stored in the memory 112. In particular, the memory 112 stores target application performance module 114, target cloud infrastructure performance module 116, and cloud configuration determination module 118.

The illustrated target application performance module 114 characterizes a performance of a target application.

The target cloud infrastructure performance module 116 characterizes a workload of at least one target cloud infrastructure.

The cloud configuration determination module 118 represents the target application performance with a set of bins each corresponding to a resource subsystem of a virtual machine and a performance score that is required to deploy the target application and performance. The module 118 fills the bins with performance values for target cloud infrastructures. Using the filled bins, the module 118 determines a set of virtual machines (VMs) needed to satisfy the target performance in the target cloud infrastructure(s).

The cloud configuration determination device 102 also includes one or more communication interfaces (I/O), such as network interfaces 120 for communicating with external devices, such as the user device 106. The various hardware components 110, 112, 120 of the cloud configuration determination device 102 may all be connected by a bus 124.

With continued reference to FIG. 3, the cloud configuration determination device 102 is communicatively linked to a user interface device (GUI) 126 via a wired and/or wireless link. In various embodiments, the user interface device 126 may include one or more of a display device, for displaying information to users, such as an optimal cloud recommendation to a human operator 128 for review, and a user input device, such as a keyboard or touch or writable screen, for inputting instructions, and/or a cursor control device, such as a mouse, trackball, or the like, for communicating user input information and command selections to the processor 110. Specifically, the user interface device 126 includes at least one of an input device and an output device, both of which include hardware, and which are communicatively linked with the server 104 via wired and/or wireless link(s).

With continued reference to FIG. 3, the cloud recommendation system 100 includes a storage device 130 that is part of or in communication with the cloud configuration determination device 102. In one embodiment, the cloud configuration determination device 102 can be in communication with a server (not shown) that hosts storage device 130 for storing historical data.

The memory 112, 122 may represent any type of tangible computer readable medium such as random access memory (RAM), read only memory (ROM), magnetic disk or tape, optical disk, flash memory, or holographic memory. In one embodiment, the memory 112, 122 may each comprise a combination of random access memory and read only memory. The digital processor 110 can be variously embodied, such as by a single-core processor, a dual-core processor (or more generally by a multiple-core processor), a digital processor and cooperating math coprocessor, a digital controller, or the like. The digital processor 110, in addition to controlling the operation of the respective cloud configuration determination device 102, executes instructions stored in memory 112, 122 for performing the parts of the method outlined below.

The software modules as used herein, are intended to encompass any collection or set of instructions executable by the cloud configuration determination device 102 so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on the server or other location to perform certain functions.

The communication interfaces 120 may include, for example, a modem, a router, a cable, and and/or Ethernet port, etc.

As will be appreciated, while two computing devices 104, 106 are illustrated by way of example, the system 100 may be hosted by fewer or more linked computing devices. Each computing device may include, for example, a server computer, desktop, laptop, or tablet computer, smartphone or any other computing device capable of implementing the method described herein.

Figure 4A:
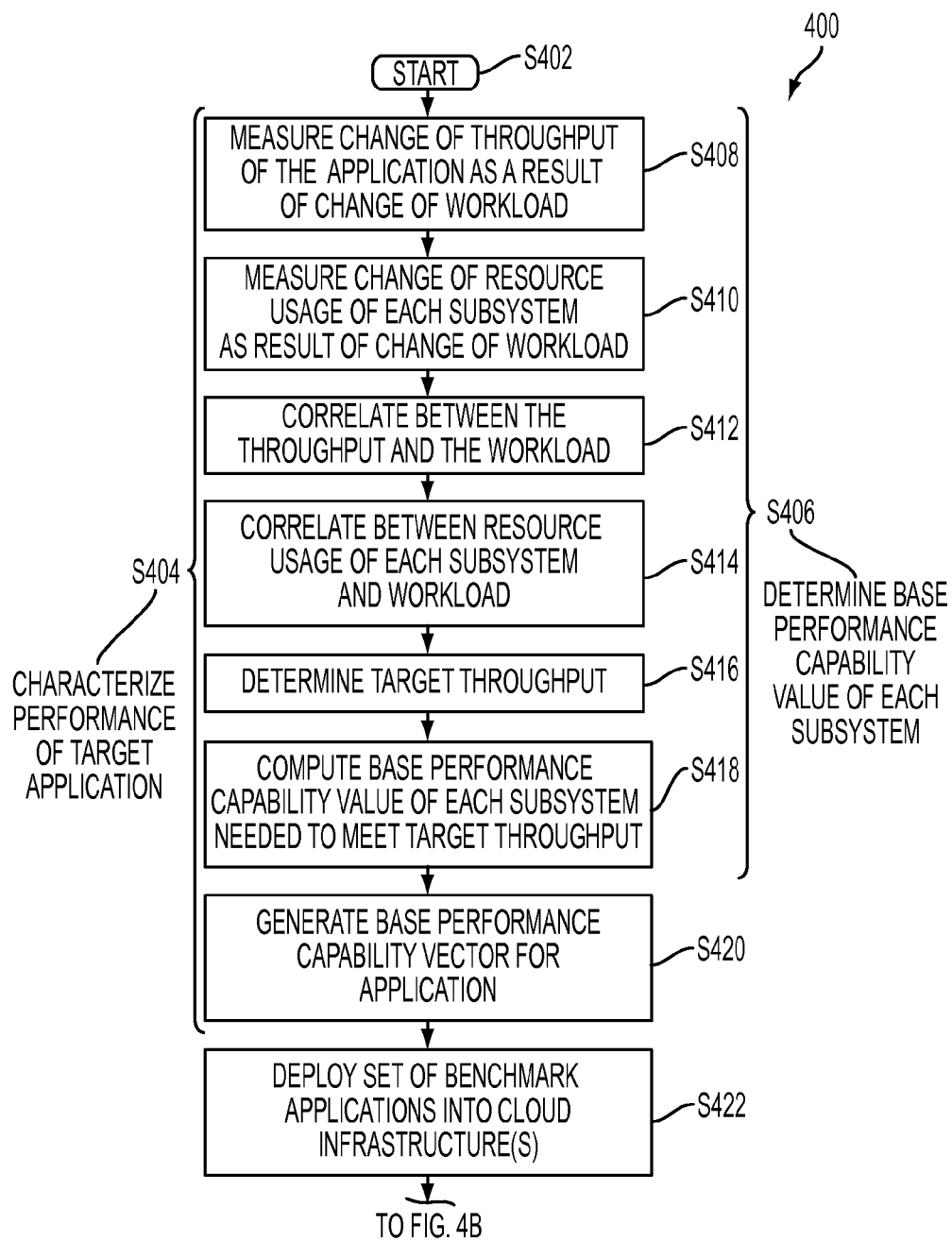
FIGS. 4A and 4B show a flow chart illustrating an exemplary method for identifying a cloud configuration according to another aspect of the exemplary embodiment.
Figure 4B:
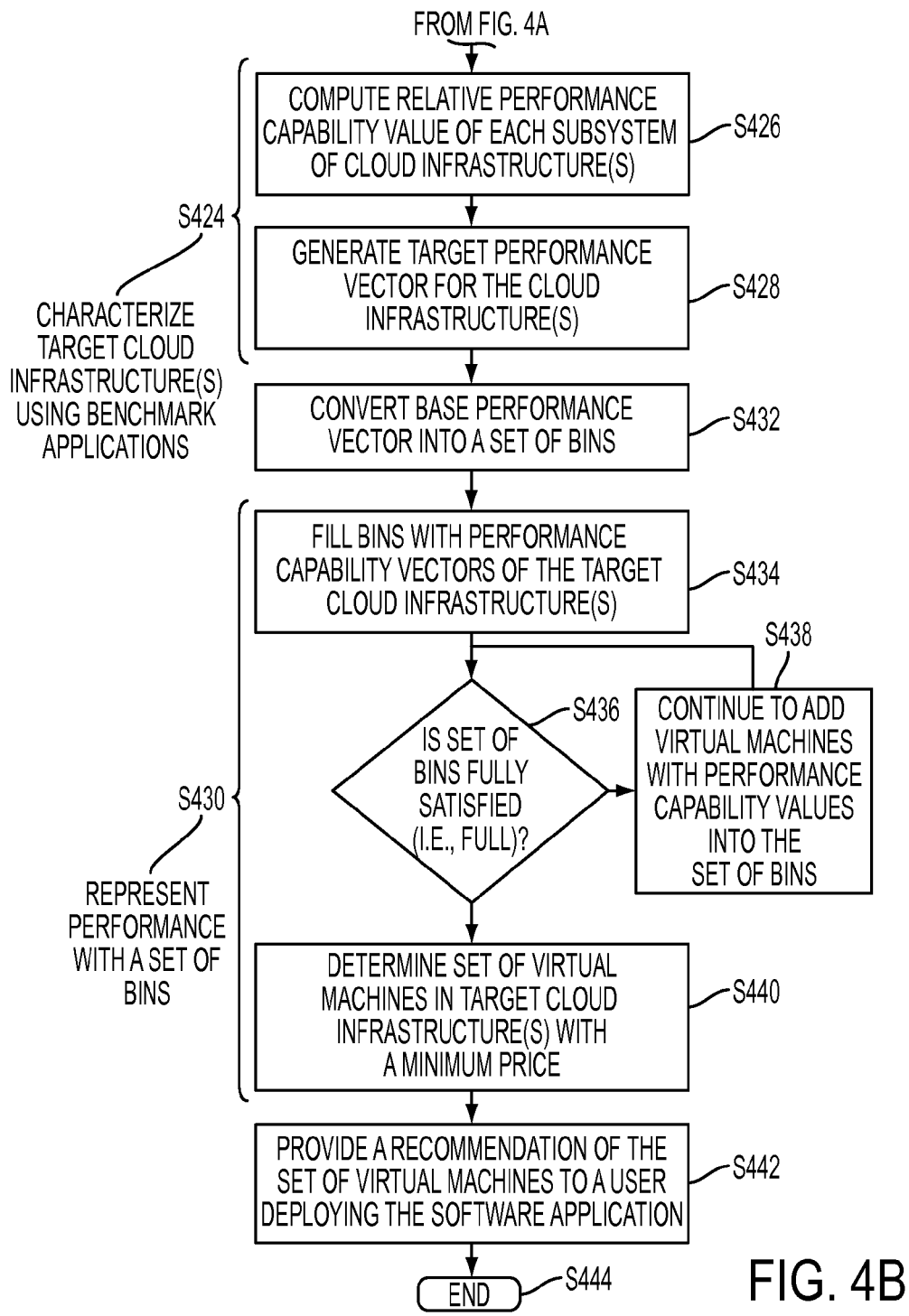

FIGS. 4A and 4B show a flow chart illustrating an exemplary method 400 for identifying a cloud configuration according to another aspect of the exemplary embodiment. The method starts a S402. At S404, the system 100 characterizes the performance and workload of a target application, which is a software application that a cloud user desires to deploy. The target application performance module 114 characterizes the target application in the context of its resource sub-system usage pattern by deploying the application into a white-box test-bed and conducting measurements. A workload simulator generates synthetic loads with various data access patterns, such as, for example, the ratio of database write over read transactions and the ratio of business logic computation over read and write. In one embodiment, the workload simulator can use historical data to sort and replay the workload to give systematic stress to the target application. There is no limit to the type of applications that the white-box test bed can run. Example target applications can be CPU-intensive, memory-intensive, I/O intensive, and network intensive.

Figure 5A:
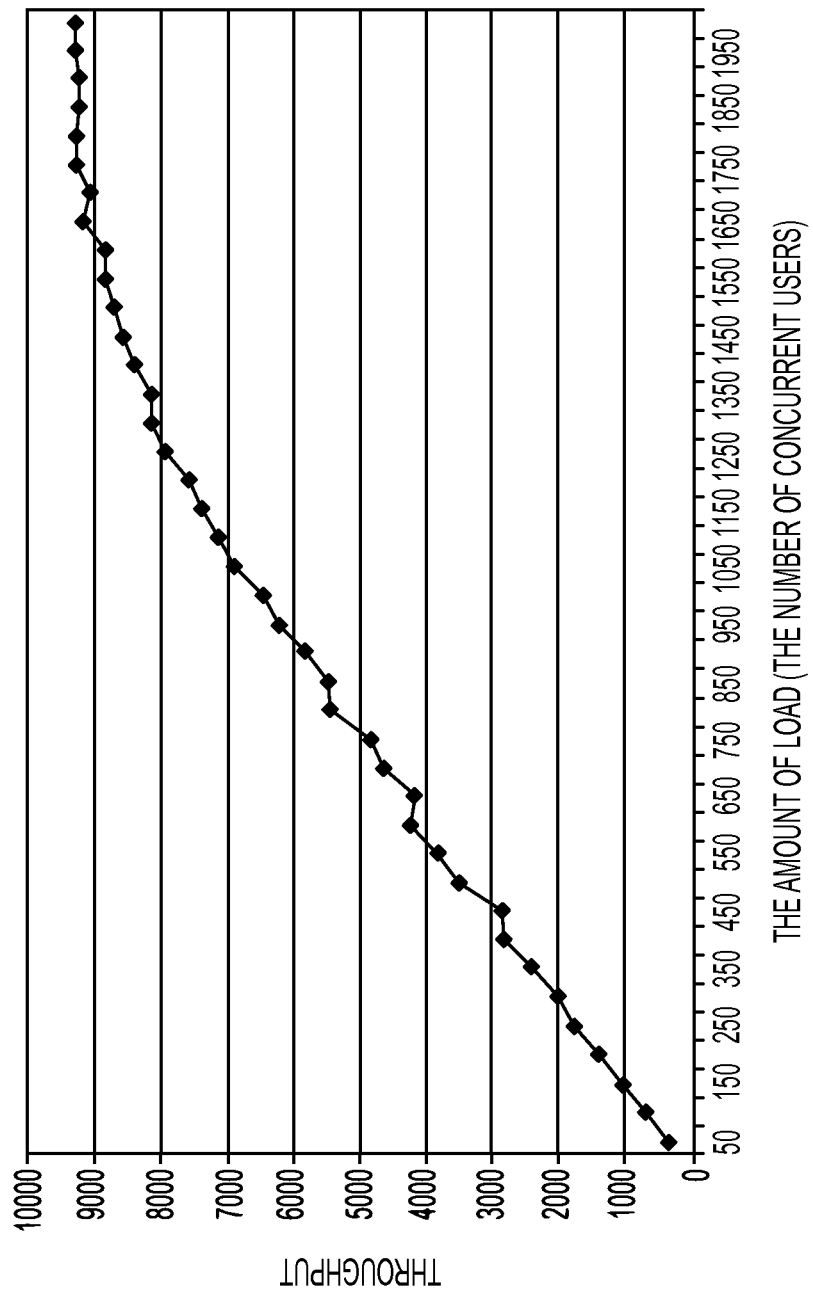
FIGS. 5A and 5B show example data collected for characterizing a performance of a target application and workload.

Continuing with FIGS. 4A and 4B, to characterize the performance of the target application, the module 114 determines a resource usage pattern of the subsystems needed to deploy the target application. To characterize the performance, the module 114 determines a performance capability value of each sub-system at S406. Module 114 measures a change in throughput of the target application as a change in workload at S408. FIG. 5A shows a table that records the change in throughput using example data.

The module 114 correlates between the throughput and workload at S410. A regression model is used to present the correlation between throughput and load. In one embodiment, the following model can be applied:

$$T=\beta L \quad (1)$$

where T is throughput;
L is the amount of load; and,
β is the increase rate of throughput per unit of load.

The increase rate β can be obtained by calibrating the function to fit into the actual curve of throughput.

Figure 5B:
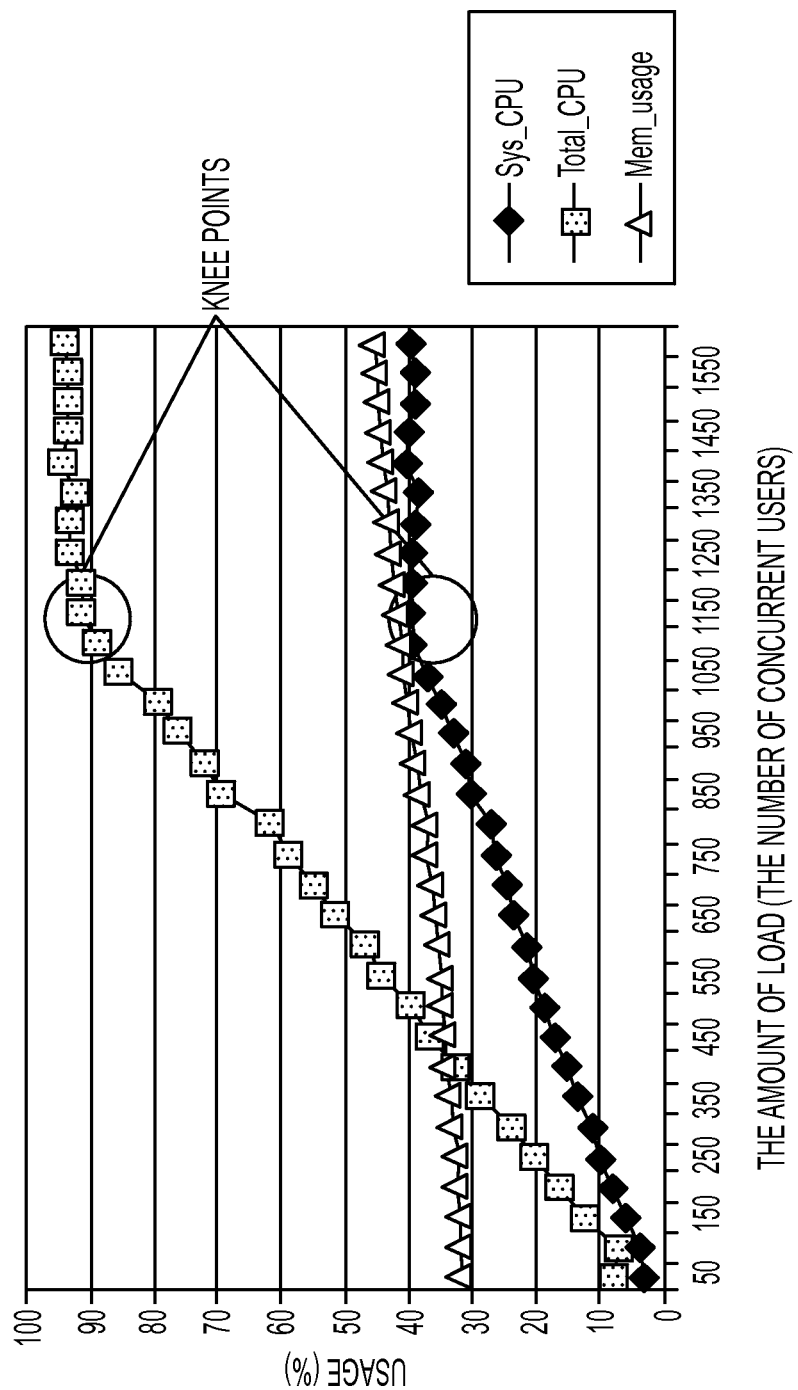

Continuing with FIGS. 4A and 4B, the module 114 also measures a change of the resource usage of each subsystem as a result of the change of workload at S412. FIG. 5B is another regression model that shows load changes that were recorded for an example sub-system's usage. The correlation between the load change and usage can be obtained at S414 using the following equation:

$$U(r_i)=\alpha_i L + b_i \quad (2)$$

where $U(r_i)$ is the normalized usage of a resource sub-system;
$r_i$ approximates within the range $0<U(r)\leq 100$);
$\alpha_i$ is the normalized increase rate of the resource usage per unit of load; and,
$b_i$ is a base resource consumption.

The normalized increase rate $\alpha_i$ and base resource consumption $b_i$ can be obtained by calibrating the function to fit into an actual curve of the resource usage pattern. For the purpose of describing the disclosure, the portion of the low load in the curve is used hereon. The regression models generated by equations (1) and (2) can be linear models like the examples shown in FIGS. 5A and 5B. Alternatively, the linear model can be tweaked to obtain other models.

Continuing with FIGS. 4A and 4B, the system determines a target throughput for the target application using the regression models at S416. More specifically, the module 114 computes a performance capability value of each resource sub-system to meet a given target throughput of the application at S418. Specifically, the base performance capability value $C_B(r_i)$ of a resource sub-system $r_i$ is computed with the following equation:

$$C_B(r_i)=(\alpha i/\beta)T^t/U(r_i)^* \quad (3)$$

where αi is the normalized increase rate of the resource usage $r_i$ per unit of load
β is the increase rate of the throughput;
$T^t$ is the given target throughput;
$U(r_i)^*$ is the normalized maximum resource usage; and,
(αi/β) indicates the normalized usage of a resource sub-system $r_i$ to increase a unit of throughput.

The normalized increase rate αi is generally within the range $(0<\alpha i \leq 100)$. Furthermore, the normalized maximum resource usage $U(r_i)^*$ is 100. Thus, the equation (3) indicates an amount of resource capability that is required to meet the target throughput in the white-box test-bed. For $C_B(r_i)$ being greater than 1, the target application requires more resource capability than the system has. For $C_B(r_i)$ being less than or equal to 1, the resource sub-systems can meet the throughput goals.

Next, the module 114 uses the base performance capability values (i.e., the resource usage pattern) to generate a performance capability vector for the target application at S420. The base performance capability vector for the target application and throughput is a set of performance capability values and is represented by the following equation:

$$V_B=[C_B(r_1)C_B(r_2)\ldots C_B(r_n)] \quad (4)$$

Each feature of the performance capability vector represents a performance capability value of each resource sub-system needed to meet the target throughput of the application.

Concurrently, target cloud infrastructure performance module 116 deploys a set of benchmark applications into at least one target cloud infrastructure at S422. The target cloud infrastructure performance module characterizes a workload of the target cloud infrastructure(s) at S424.

Although the application's workload is constant, the target cloud configuration may have different performance characteristics for the given application and its workload. To capture the performance characteristics of the target cloud configuration, a configurable benchmark suite collects various statistics using benchmark applications. The module 116 measures the performance capabilities of various resource subsystems. The module 116 more specifically captures the relative performance capability value, $C_c(r)$, of the target cloud configuration against the white-box cloud configuration. Using the benchmarking results, the module 116 computes a relative performance capability value of each subsystem of the at least one target cloud infrastructure at S426 with the following equation:

$$C_c(r_i) = T(r_i)/B(r_i) \qquad (5)$$

where $B(r_i)$ is the benchmarking result of a resource subsystem $r_i$ in the white-box cloud configuration; and $T(r_i)$ is one in the target cloud configuration.

Using the relative performance capability values determined at (5), module 116 generates a target performance vector for the each target cloud infrastructure at S428. The vector is represented as the following:

$$V_c = [C_c(r_1) C_c(r_2) \ldots C_c(r_n)] \qquad (6)$$

The module computes target performance capability vectors for each candidate cloud of interests.

Continuing with FIGS. 4A and 4B, the cloud configuration determination module 118 explores various cloud configurations offered from cloud providers to identify an optimal cloud configuration. More specifically, the recommender system 100 searches for the optimal cloud configuration using the base performance capability vector of eqn. (4) and the target performance vectors of eqn. (6).

Figure 6A:
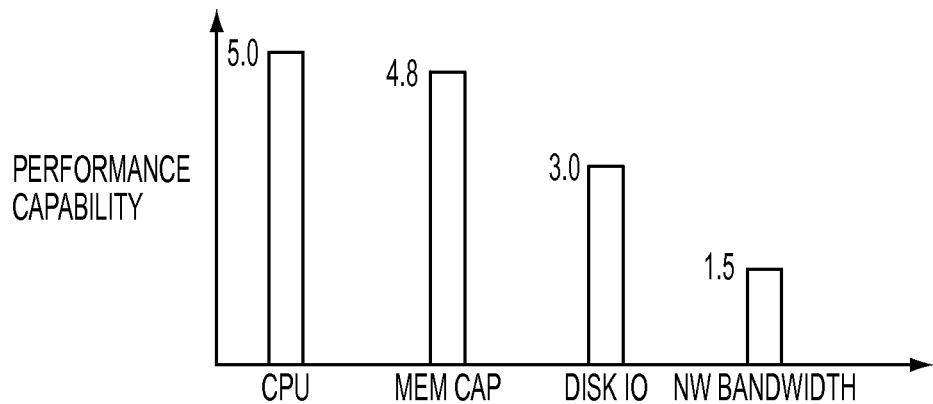
FIG. 6A shows a set of bins each corresponding to a resource subsystem of a virtual machine and a performance score that is required to deploy a target application and meet its target performance.
Figure 6B:
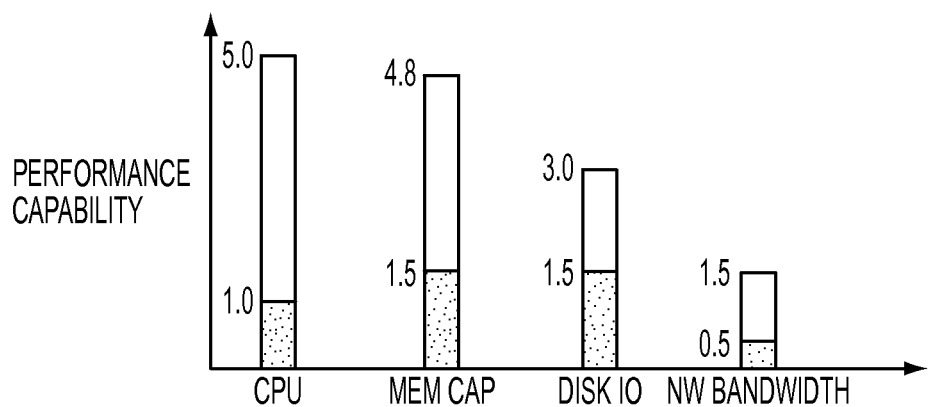
FIG. 6B shows the set of bins in FIG. 6A partially filled with performance values for selected target virtual machines.

The module 118 represents the performance values with a set of bins at S430. More specifically, the module 118 converts the base performance vector, computed at eqn. (4), into the set of bins at S432. Each bin corresponds to a resource subsystem of a virtual machine and a performance score that is required to deploy the target application and meet the target performance. More specifically, each bin has a size that corresponds to the base performance capability value of the subsystem. FIG. 6A shows an example of four bins representing the base performance capability vector with four resource sub-systems being CPU, memory capability, Disk IO and NW bandwidth. FIG. 6B shows the set of bins in FIG. 6A partially filled with performance values for selected target virtual machines.

Most cloud providers have pre-determined, small cloud configuration types. These cloud providers offer the cloud service at certain prices based on the different sub-system capacities of the virtual machine types. The module 118 fills the bins with the capability values of virtual machines at S434. More specifically, the module 118 uses the performance capability vectors for each target cloud infrastructure that was computed at eqn. (6). FIG. 6A shows an example of the four bins of FIGS. 5A and 5B being partially filled with the capability values of virtual machine(s).

By filling the bins, the module 118 is fitting the numerical capability values of pre-determined VM types into the base numerical capabilities defined in the base performance capability vector. As mentioned, the system 100 uses vectors to fill bins for determining a set of virtual machines needed to satisfy a target cloud infrastructure. In one implementation, an optimal cloud configuration can have multiple heterogeneous virtual machines. In this example, multiple heterogeneous VMs can handle workloads in parallel with a load balancing technique for parallel applications and for clustered parallel database transactions and parallel computation.

The present disclosure aims to find a combination of virtual machines that meet the target throughput. The disclosure aims to further find a combination of VMs that minimizes the cumulated price of VMs. The optimal cloud configuration is determined by computing the distance between the base performance capability vector and cumulated performance capability vectors of a set of VMs using the equation:

$$D = \Sigma_{i=1}^n \max\{C_B(r_i) - C_c(r_i), 0\} \qquad (7)$$

where $C_B(r_i)$ is the base performance capability value of a resource sub-system $r_i$ in the base performance capability vector; and, $C_c(r_i)$ is a performance capability value of $r_i$ in the performance capability vector of a VM type to be filled in bins.

The optimal cloud configuration is determined as being the cloud configuration measuring the smallest distance.

In the instance that the difference between the performance capability value of a resource sub-system and the base performance capability value of the resource sub-system $C_B(r_i)$ is less than zero ($C_B(r_i) - C_c(r_i) < 0$), the system considers the difference as being zero because there is enough resource capability. Otherwise, the system will find another VM to fill in bins since it cannot meet the target throughput.

Continuing with FIGS. 4A and 4B, the module 118 determines if the bins are fully satisfied at S436. In response to the bins not being full (NO at S436), the module 118 continues to add the performance capability values of additional virtual machines into the bins at S438. The system has to fill all bins even if the size of the bin is very small, meaning that the required performance capability of the resource sub-system is relatively small (e.g., see the bin representing the NW bandwidth in FIG. 5). Otherwise, a bottleneck of the cloud configuration can occur in any resource sub-system that does not have enough capability even if the resource sub-system is not critical to achieve a target throughput.

In response to the bins being full (YES at S436), the module 118 uses the full bins to identify the cloud configuration being offered at a minimum price at S440. In other words, the module determines a set of virtual machines that is included in target cloud infrastructure(s) with the minimum price at S440. The module 118 provides a recommendation of the set of virtual machines to a user deploying the software application at S442. The method ends at S444.

Because there can be a number of different combinations of virtual machines that can meet the target throughput, the process of using the bins in a search remedies inefficiencies resulting from blindly exploring a search space in conventional approaches. A set of virtual machines in at least one target cloud infrastructure with a minimum price can be determined herein using various algorithms, such as a best-first search algorithm.

Figure 7A:
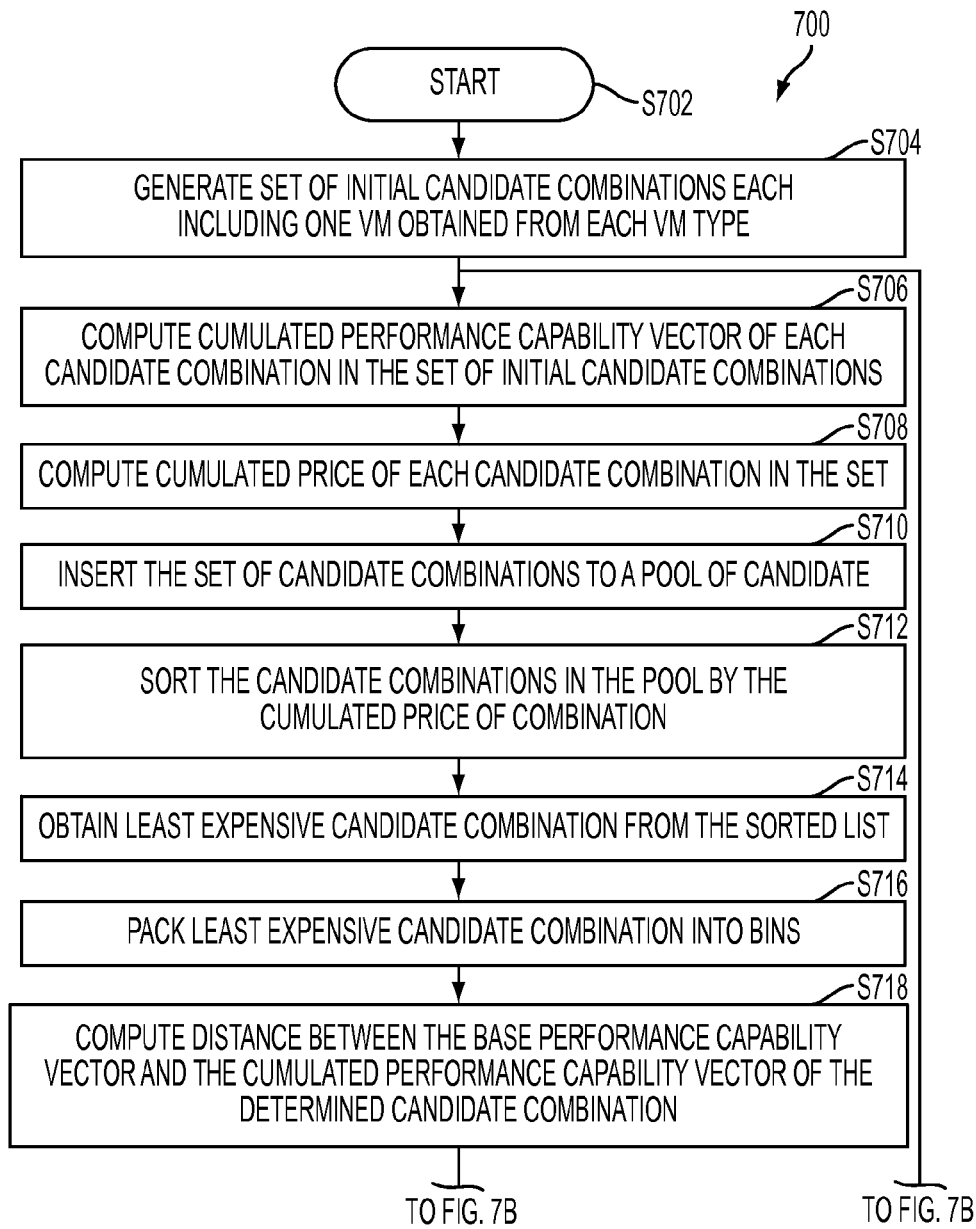
FIGS. 7A and 7B show a flow chart illustrating a method for determining a set of virtual machines in an optimal target cloud configuration according to one aspect of the exemplary embodiment.
Figure 7B:
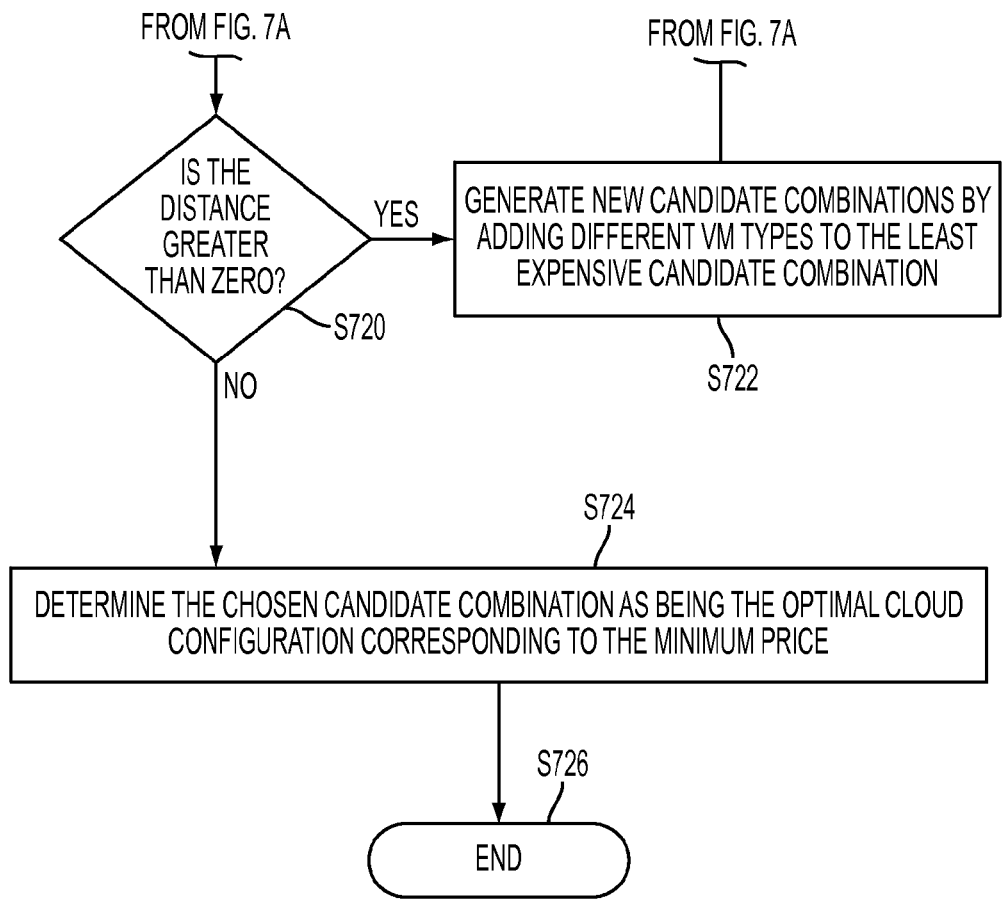

Now referring to FIGS. 7A and 7B, a method 700 is shown for determining the set of virtual machines in an optimal target cloud configuration. The method starts at S702. Because the number of virtual machines of a VM type is unlimited, and each VM type has a specific price and the performance capability vector, the optimal cloud configuration can be a combination of these VM types. The combination can consist of any number of each VM type. Therefore, the system 100 generates a set of initial candidate combinations at S704. Each combination includes one VM obtained from each VM type.

A cumulated performance capability vector is computed for each candidate combination at S706. The cumulated performance capability vector is computed by summing corresponding features of performance capability vectors of VMs in the combination. In other words, the corresponding performance values of a resource subsystem are totaled. At S708, a cumulated price is computed for each candidate combination in the set by summing prices of all VMs in the combination.

Continuing with FIGS. 7A and 7B, the set of candidate combinations are inserted into a pool of candidate combinations at S710. The candidate combinations in the pool are sorted using the cumulated prices at S712. More specifically, the candidate combinations are sorted by price in ascending order. The least expensive candidate combination is determined as the first combination in the sorted list at S714. This combination is packed into the bins at S716.

The distance is computed between the base performance capability vector and the cumulated performance capability vector of the determined candidate combination at S718. This distance is computed using equation (7) discussed above. In response to the distance being greater than zero (D>0) (YES at S720), the system generates a new set of candidate combinations at S722. Each new combination includes an additional VM placed into the least expensive candidate combination (determined at S714). Then, the process is repeated at S706. In response to the distance being less than or equal to zero (NO at S720), the chosen candidate combination is determined as being the optimal cloud configuration corresponding to the minimum price at S724. The method ends at S726.

Some candidate combinations that can achieve target throughput are more expensive than an optimal cloud configuration. Using the method 700 described in FIGS. 7A and 7B, a search space can be reduced by pruning out these more expensive candidate combinations.

Another aspect of the present disclosure is the ability to characterize a virtual machine in a black-box cloud. By converting a virtual machine (or physical server) into a performance vector, the performance of the machine can be characterized using a benchmark suite. The performance can be encoded into a performance capability vector that can be used for a cost-efficient performance evaluation.

A further aspect of the disclosure is the ability to compute a performance requirement needed to achieve a target throughput. By characterizing the performance of a target complex application in terms of the usage pattern of resource sub-systems, the required capability of each sub-system needed to achieve the target throughput can be computed. The performance capabilities are encoded into the base performance capability vector to represent the performance requirement for given application and its throughput goal.

Another aspect of the disclosure relates to an efficient process for identifying an optimal cloud configuration in black-box clouds. When cloud providers have pre-determined cloud configuration types with specific prices, a best first search method disclosed herein can reduce the search space and speed up the search.

Although the method in FIGS. 2, 4 and 7 are illustrated and described above in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system 100, wherein the disclosure is not limited to the specific applications and embodiments illustrated and described herein.

The method illustrated in FIGS. 2 and 4A and 4B may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 2, 4A, 4B, 7A and 7B can be used to implement the method.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:
1. A computer implemented method for identifying a cloud configuration for deploying a software application stored in memory and executed by a processor, the method comprising:
   characterizing a performance of a target application and workload;
   deploying a set of benchmark applications into at least one target cloud infrastructure;
   characterizing the at least one target infrastructure using the set of benchmarking applications, the characterizing including generating a base performance capability vector for the target application;
   computing a relative performance capability value for each subsystem of the at least
   one target cloud infrastructure;
   generating a target performance vector for the at least one target cloud infrastructure
   using the relative performance capability value;
   representing the performance with a set of bins each corresponding to a resource
   subsystem of a virtual machine and a performance score that is required to deploy the target application and meet the target performance;
   filling the bins by fitting the performance capability value for candidate set of virtual
   machines into the base numerical capabilities defined in the base performance capability vector;

computing a distance between the base performance capability vector and a cumulated performance capability vector of the combination of candidate virtual machines;
determining if the distance is greater than zero;
in response to the distance being greater than zero, generating a new candidate combination of virtual machines;
in response to the distance not being greater than zero, associating the virtual machines in the candidate combination as being needed to satisfy the at least one target cloud infrastructure; and
providing a recommendation of the set of virtual machines to a user deploying the software application.

2. The method of claim 1, wherein the characterizing the performance of the target application further includes:
determining a base performance capability value of the each subsystem; and,
using the base performance capability values for, generating athe base performance capability vector for the target application.

3. The method of claim 2, wherein the determining the base performance capability value of each subsystem includes:
measuring a change of throughput of the target application as a result of a change of workload;
measuring a change of the resource usage of each subsystem as a result of the change of workload;
correlating between the throughput and the workload;
correlating between resource usage for the each subsystem and the workload;
determining a target throughput; and,
using the correlations, computing the base performance capability value of the each subsystem needed to meet the target throughput.

4. The method of claim 2, wherein the representing the performance with a set of bins includes:
converting the base performance vector into a set of bins, each bin representing a subsystem and having a size corresponding to the base performance capability value of the subsystem.

5. The method of claim 4, wherein the filling the bins includes:
filling the bins with corresponding performance capability vectors of the select target cloud infrastructure.

6. The method of claim 1, wherein the filling the bins includes:
continuing to add virtual machines with performance capability values into the set of bins until the set of bins is fully filled.

7. The method of claim 1, wherein the determining the set of virtual machines needed to satisfy the target throughput in at least one target cloud infrastructure includes:
determining the set of virtual machines in at least one target cloud infrastructure with a minimum price using various algorithms such as a best-first search algorithm.

8. The method of claim 1, wherein the determining the set of virtual machines in at least one target cloud infrastructure with the minimum price includes:
generating a set of initial candidate combinations each including one VM obtained from each VM type;
computing a cumulated performance capability vector of each candidate combination in the set of initial candidate combinations;
computing a cumulated price of each candidate combination in the set;
inserting the set of candidate combinations to a pool of candidate combinations;
sorting the candidate combinations in the pool by the cumulated price of combination in ascending order;
obtaining a least expensive candidate combination from the pool; and,
packing the chosen candidate combination into the bins.

9. The method of claim 8, wherein the determining the set of virtual machines in at least one target cloud infrastructure with the minimum price further includes:
computing a distance between the base performance capability vector and the cumulated performance capability vector of the chosen candidate combination; and,
for a distance being equal to zero, selecting the chosen candidate combination as the cloud configuration corresponding with the minimum price.

10. The method of claim 8, wherein the computing the cumulated performance capability vector includes:
summing corresponding elements of performance capability vectors of VMs in the combination.

11. The method of claim 8, wherein the computing the cumulated price includes
summing prices of all VMs in the combination.

12. A computer program product comprising non-transitory media which encodes instructions for performing the method of claim 1.

13. A system for identifying a cloud configuration for deploying a software application, the system comprising:
a processor; and
a non-transitory computer readable memory storing instructions that are executable by the processor for:
characterizing a performance of a target application and workload;
deploying a set of benchmark applications into at least one target cloud infrastructure;
characterizing the at least one target infrastructure using the set of benchmarking applications, the characterizing including generating a base performance capability vector for the target application;
computing a relative performance capability value for each subsystem of the at least one target cloud infrastructure;
generating a target performance vector for the at least one target cloud infrastructure using the relative performance capability value;
representing the performance with a set of bins each corresponding to a resource subsystem of a virtual machine and a performance score that is required to deploy the target application and meet the target performance;
filling the bins by fitting the performance capability value for candidate set of virtual machines into the base numerical capabilities defined in the base performance capability vector;
computing a distance between the base performance capability vector and a cumulated performance capability vector of the combination of candidate virtual machines;
determining if the distance is greater than zero;
in response to the distance being greater than zero, generating a new candidate combination of virtual machines;
in response to the distance not being greater than zero, associating the virtual machines in the candidate combination as being needed to satisfy the at least one target cloud infrastructure; and
providing a recommendation of the set of virtual machines to a user deploying the software application.

14. The system of claim 13, wherein the processor is further configured to:
determine a base performance capability value of the each subsystem; and use the base performance capability values for generating the base performance capability vector for the target application.

15. The system of claim 14, wherein the processor is further configured to:
measure a change of throughput of the target application as a result of a change of workload;
measure a change of resource usage of each subsystem as a result of the change of workload;
correlate between the throughput and the workload;
correlate between resource usage for the each subsystem and the workload;
determine a target throughput; and
use the correlations to compute the base performance capability value of the each subsystem needed to meet the target throughput.

16. The system of claim 13, wherein the processor is further configured to:
convert the base performance vector into the set of bins, each bin representing a subsystem and having a size corresponding to the base performance capability value of the subsystem;
fill the bins with corresponding performance capability vectors of the select target infrastructure;
continue to add virtual machines with performance capability values into the set of bins until the set of bins is full; and
determine the set of virtual machines in the at least one target cloud infrastructure with a minimum price.

17. The system of claim 13, wherein processor is further configured to:
generate a set of initial candidate combinations each including one VM obtained from each VM type;
compute a cumulated performance capability vector of each candidate combination in the set of initial candidate combinations;
compute a cumulated price of each candidate combination in the set;
insert the set of candidate combinations to a pool of candidate combinations;
sort the candidate combinations in the pool by the cumulated price of combination in ascending order;
obtain a least expensive candidate combination from the pool; and
pack the chosen candidate combination into the bins.

18. The system of claim 13, wherein the processor is further configured to:
compute a distance between the base performance capability vector and the cumulated performance capability vector of the chosen candidate combination; and
for a distance being equal to zero, select the chosen candidate combination as the cloud configuration corresponding with the minimum price.

* * * * *